(12) United States Patent
Yonge, III et al.

(10) Patent No.: US 8,503,480 B2
(45) Date of Patent: Aug. 6, 2013

(54) MANAGING COMMUNICATIONS OVER A SHARED MEDIUM

(75) Inventors: Lawrence W. Yonge, III, Ocala, FL (US); Srinivas Katar, Gainesville, FL (US); Richard E. Newman, Pasadena, CA (US)

(73) Assignee: Qualcomm Atheros, Inc., San Jose, CA (US)

( * ) Notice: Subject to any disclaimer, the term of this patent is extended or adjusted under 35 U.S.C. 154(b) by 421 days.

(21) Appl. No.: 12/133,325

(22) Filed: Jun. 4, 2008

(65) Prior Publication Data
US 2009/0074007 A1   Mar. 19, 2009

Related U.S. Application Data

(60) Provisional application No. 60/941,949, filed on Jun. 4, 2007.

(51) Int. Cl.
*H04J 3/16* (2006.01)
*H04J 3/22* (2006.01)

(52) U.S. Cl.
USPC ........... 370/468; 370/347; 370/464; 370/498; 370/478; 709/227; 709/231; 709/213; 709/248

(58) Field of Classification Search
USPC ................. 370/468, 347, 344, 464, 466, 478, 370/498; 709/227, 231, 213, 248, 245, 202
See application file for complete search history.

(56) References Cited

U.S. PATENT DOCUMENTS

| | | | |
|---|---|---|---|
| 4,578,530 A | | 3/1986 | Zeidler |
| 4,689,786 A | | 8/1987 | Sidhu et al. |
| 4,807,248 A | * | 2/1989 | Pyatt et al. .................... 375/366 |
| 5,328,530 A | | 7/1994 | Semiatin et al. |
| 5,359,625 A | | 10/1994 | Vander Mey et al. |
| 5,570,355 A | | 10/1996 | Dail et al. |
| 5,682,428 A | | 10/1997 | Johnson |
| 5,732,076 A | | 3/1998 | Ketseoglou et al. |
| 6,074,086 A | | 6/2000 | Yonge, III |
| 6,111,919 A | | 8/2000 | Yonge, III |
| 6,141,355 A | | 10/2000 | Palmer et al. |
| 6,167,137 A | | 12/2000 | Marino et al. |

(Continued)

FOREIGN PATENT DOCUMENTS

| | | |
|---|---|---|
| EP | 1748574 | 1/2007 |
| EP | 1748597 A1 | 1/2007 |

(Continued)

OTHER PUBLICATIONS

International Search Report and Written in Opinion in PCT Application No. PCT/US2009/047530, Aug. 27, 2009, 9 pages.

(Continued)

*Primary Examiner* — Andrew Chriss
*Assistant Examiner* — Jamal Javaid
(74) *Attorney, Agent, or Firm* — DeLizio Gilliam, PLLC

(57) ABSTRACT

Systems and methods for allocating network bandwidth between a plurality of networks. Requests for bandwidth allocation from other networks can be received. A coexistence frame requesting an allocation of bandwidth for a local network can be generated based upon the bandwidth allocation requests received from other networks. The coexistence frame can be transmitted, and utilization of the requested allocation can be delayed by a reservation period.

52 Claims, 9 Drawing Sheets

U.S. PATENT DOCUMENTS

| | | |
|---|---|---|
| 6,173,400 B1 | 1/2001 | Perlman et al. |
| 6,185,185 B1 | 2/2001 | Bass et al. |
| 6,188,690 B1 | 2/2001 | Holden et al. |
| 6,189,040 B1 | 2/2001 | Oohara |
| 6,201,794 B1 | 3/2001 | Stewart et al. |
| 6,243,761 B1 | 6/2001 | Mogul et al. |
| 6,269,132 B1 | 7/2001 | Yonge, III |
| 6,269,163 B1 | 7/2001 | Rivest et al. |
| 6,272,135 B1 | 8/2001 | Nakatsugawa |
| 6,278,685 B1 | 8/2001 | Yonge, III |
| 6,307,940 B1 | 10/2001 | Yamamoto et al. |
| 6,310,892 B1 | 10/2001 | Olkin |
| 6,388,995 B1 | 5/2002 | Gai et al. |
| 6,519,231 B1 | 2/2003 | Ding et al. |
| 6,574,195 B2 | 6/2003 | Roberts |
| 6,591,364 B1 | 7/2003 | Patel |
| 6,606,303 B1 | 8/2003 | Hassel et al. |
| 6,631,136 B1 | 10/2003 | Chowdhury et al. |
| 6,711,163 B1 | 3/2004 | Reid et al. |
| 6,775,656 B1 | 8/2004 | Gettwart et al. |
| 6,804,252 B1 | 10/2004 | Johnson |
| 6,904,462 B1 | 6/2005 | Sinha |
| 6,910,136 B1 | 6/2005 | Wasserman et al. |
| 7,039,021 B1 | 5/2006 | Kokudo |
| 7,085,284 B1 | 8/2006 | Negus |
| 7,181,620 B1 | 2/2007 | Hur |
| 7,234,058 B1 | 6/2007 | Baugher et al. |
| 7,346,021 B2 | 3/2008 | Yoshizawa et al. |
| 7,350,076 B1 | 3/2008 | Young et al. |
| 7,352,770 B1 | 4/2008 | Yonge, III |
| 7,369,579 B2 | 5/2008 | Logvinov et al. |
| 7,409,543 B1 | 8/2008 | Bjorn |
| 7,496,039 B2 | 2/2009 | Yamada et al. |
| 7,506,042 B2 | 3/2009 | Ayyagari |
| 7,558,294 B2 | 7/2009 | Yonge, III |
| 7,558,575 B2 | 7/2009 | Losh et al. |
| 7,609,681 B2 * | 10/2009 | Kurobe et al. ............. 370/347 |
| 7,756,039 B2 | 7/2010 | Yonge, III |
| 7,797,751 B1 | 9/2010 | Hughes et al. |
| 7,804,842 B2 | 9/2010 | Malik et al. |
| 7,826,618 B2 | 11/2010 | Klingler et al. |
| 7,894,487 B2 | 2/2011 | Yonge, III |
| 7,949,356 B2 | 5/2011 | Yonge, III |
| 8,112,358 B2 | 2/2012 | Yonge, III |
| 8,170,051 B2 | 5/2012 | Yonge, III et al. |
| 2001/0000709 A1 | 5/2001 | Takahashi et al. |
| 2002/0015496 A1 | 2/2002 | Weaver, III |
| 2002/0025810 A1 | 2/2002 | Takayama et al. |
| 2002/0029260 A1 | 3/2002 | Dobbins et al. |
| 2002/0060986 A1 | 5/2002 | Fukushima et al. |
| 2002/0097679 A1 * | 7/2002 | Berenbaum ............. 370/232 |
| 2002/0107023 A1 | 8/2002 | Chari et al. |
| 2002/0114303 A1 | 8/2002 | Crosbie et al. |
| 2002/0122411 A1 * | 9/2002 | Zimmerman et al. ........ 370/349 |
| 2002/0124177 A1 | 9/2002 | Harper et al. |
| 2002/0137462 A1 | 9/2002 | Rankin |
| 2002/0141417 A1 * | 10/2002 | Umayabashi ........... 370/395.41 |
| 2003/0012166 A1 | 1/2003 | Benveniste |
| 2003/0018812 A1 | 1/2003 | Lakshminarayana et al. |
| 2003/0048183 A1 | 3/2003 | Vollmer et al. |
| 2003/0067892 A1 | 4/2003 | Beyer et al. |
| 2003/0086437 A1 | 5/2003 | Benveniste |
| 2003/0095551 A1 | 5/2003 | Gotoh et al. |
| 2003/0137993 A1 | 7/2003 | Odman |
| 2003/0193959 A1 | 10/2003 | Lui et al. |
| 2003/0224784 A1 | 12/2003 | Hunt et al. |
| 2003/0228846 A1 | 12/2003 | Berliner et al. |
| 2003/0229783 A1 | 12/2003 | Hardt |
| 2004/0047319 A1 | 3/2004 | Elg |
| 2004/0070912 A1 | 4/2004 | Kopp |
| 2004/0081089 A1 | 4/2004 | Ayyagari et al. |
| 2004/0090982 A1 | 5/2004 | Xu |
| 2004/0165532 A1 | 8/2004 | Poor et al. |
| 2004/0190542 A1 | 9/2004 | Ono et al. |
| 2004/0210630 A1 | 10/2004 | Simonnet et al. |
| 2004/0218577 A1 | 11/2004 | Nguyen et al. |
| 2004/0234073 A1 | 11/2004 | Sato et al. |
| 2004/0264428 A1 * | 12/2004 | Choi et al. ............. 370/338 |
| 2005/0001694 A1 | 1/2005 | Berkman |
| 2005/0021539 A1 | 1/2005 | Short et al. |
| 2005/0025176 A1 | 2/2005 | Ko et al. |
| 2005/0068227 A1 | 3/2005 | Caspi et al. |
| 2005/0071631 A1 | 3/2005 | Langer |
| 2005/0089005 A1 | 4/2005 | Sakoda et al. |
| 2005/0114489 A1 | 5/2005 | Yonge, III |
| 2005/0117515 A1 | 6/2005 | Miyake |
| 2005/0117750 A1 | 6/2005 | Rekimoto |
| 2005/0135291 A1 | 6/2005 | Ketchum et al. |
| 2005/0147075 A1 | 7/2005 | Terry |
| 2005/0169222 A1 | 8/2005 | Ayyagari et al. |
| 2005/0190785 A1 | 9/2005 | Yonge, III et al. |
| 2005/0210157 A1 | 9/2005 | Sakoda |
| 2005/0243765 A1 | 11/2005 | Schrader et al. |
| 2005/0249186 A1 | 11/2005 | Kelsey et al. |
| 2006/0002406 A1 | 1/2006 | Ishihara et al. |
| 2006/0039371 A1 | 2/2006 | Castro et al. |
| 2006/0072517 A1 | 4/2006 | Barrow et al. |
| 2006/0077997 A1 | 4/2006 | Yamaguchi et al. |
| 2006/0104301 A1 | 5/2006 | Beyer et al. |
| 2006/0159260 A1 | 7/2006 | Pereira et al. |
| 2006/0168647 A1 | 7/2006 | Chiloyan |
| 2006/0224813 A1 | 10/2006 | Rooholamini et al. |
| 2006/0251017 A1 | 11/2006 | Bishop |
| 2006/0251021 A1 | 11/2006 | Nakano et al. |
| 2006/0252378 A1 | 11/2006 | Bishop |
| 2006/0256741 A1 | 11/2006 | Nozaki |
| 2006/0268746 A1 | 11/2006 | Wijting et al. |
| 2007/0004404 A1 | 1/2007 | Buckley et al. |
| 2007/0025244 A1 | 2/2007 | Ayyagari et al. |
| 2007/0025384 A1 | 2/2007 | Ayyagari et al. |
| 2007/0025391 A1 | 2/2007 | Yonge, III et al. |
| 2007/0025398 A1 | 2/2007 | Yonge, III |
| 2007/0026794 A1 | 2/2007 | Ayyagari et al. |
| 2007/0030811 A1 | 2/2007 | Frei et al. |
| 2007/0053520 A1 | 3/2007 | Eckleder |
| 2007/0058661 A1 | 3/2007 | Chow |
| 2007/0058732 A1 | 3/2007 | Riedel et al. |
| 2007/0060141 A1 | 3/2007 | Kangude et al. |
| 2007/0097867 A1 | 5/2007 | Kneckt et al. |
| 2007/0118730 A1 | 5/2007 | Platt |
| 2007/0133388 A1 | 6/2007 | Lee et al. |
| 2007/0133449 A1 | 6/2007 | Schacht et al. |
| 2007/0140185 A1 | 6/2007 | Garg et al. |
| 2007/0147322 A1 | 6/2007 | Agrawal et al. |
| 2007/0220570 A1 | 9/2007 | Dawson et al. |
| 2007/0254596 A1 | 11/2007 | Corson et al. |
| 2007/0271398 A1 | 11/2007 | Manchester et al. |
| 2007/0286074 A1 | 12/2007 | Xu |
| 2007/0286111 A1 | 12/2007 | Corson et al. |
| 2008/0002599 A1 | 1/2008 | Yau et al. |
| 2008/0151820 A1 | 6/2008 | Solis et al. |
| 2008/0181219 A1 | 7/2008 | Chen et al. |
| 2008/0186230 A1 | 8/2008 | Wengler et al. |
| 2008/0212591 A1 | 9/2008 | Wu et al. |
| 2008/0222447 A1 | 9/2008 | Ram et al. |
| 2008/0279126 A1 | 11/2008 | Katar et al. |
| 2008/0298252 A1 | 12/2008 | Yonge, III |
| 2008/0298589 A1 | 12/2008 | Katar et al. |
| 2008/0298590 A1 | 12/2008 | Katar et al. |
| 2008/0298594 A1 | 12/2008 | Yonge, III |
| 2008/0301052 A1 | 12/2008 | Yonge, III |
| 2008/0301446 A1 | 12/2008 | Yonge, III |
| 2008/0310414 A1 | 12/2008 | Yonge, III |
| 2009/0010276 A1 | 1/2009 | Yonge, III |
| 2009/0034552 A1 | 2/2009 | Yonge, III |
| 2009/0067389 A1 | 3/2009 | Lee et al. |
| 2009/0074007 A1 | 3/2009 | Yonge, III et al. |
| 2009/0092075 A1 | 4/2009 | Corson et al. |
| 2009/0106551 A1 | 4/2009 | Boren et al. |
| 2009/0116461 A1 | 5/2009 | Yonge, III |
| 2009/0154487 A1 | 6/2009 | Ryan et al. |
| 2009/0207769 A1 | 8/2009 | Park et al. |
| 2009/0311963 A1 | 12/2009 | Haverty |
| 2010/0014444 A1 | 1/2010 | Ghanadan et al. |
| 2010/0091760 A1 | 4/2010 | Yoon |
| 2010/0100724 A1 | 4/2010 | Kaliski, Jr. |
| 2012/0072715 A1 | 3/2012 | Yonge, III |

FOREIGN PATENT DOCUMENTS

| | | |
|---|---|---|
| EP | 1179919 | 7/2010 |
| JP | 3107317 A | 5/1991 |
| JP | 2002135177 A | 5/2002 |
| JP | 2005073240 A | 3/2005 |
| WO | WO9634329 A1 | 10/1996 |
| WO | WO9857439 A1 | 12/1998 |
| WO | WO02103943 A1 | 12/2002 |
| WO | WO03100996 A2 | 12/2003 |
| WO | WO2004038980 A2 | 5/2004 |

OTHER PUBLICATIONS

Faure, Jean-Philippe et al., Call for Submissions. Draft Standard for Broadband over Power Line Networks: Medium Access Control and Physical Layer Specifications. Feb. 14, 2007, 4 pages.

Faure, Jean-Philippe et al., Coexistence/interoperability Cluster, FTR SG Requirements. Draft Standard for Broadband over Power Line Networks: Medium Access Control and Physical Layer Specifications. Feb. 5, 2007, 13 pages.

Afkhamie et al., "An Overview of the upcoming HomePlug AV Standard", May 2005, IEEE 0-7803-8844-5/05, pp. 400-404.

European Search Report—EP09178487, Search Authority, Munich Patent Office, Jan. 21, 2010.

HomePlug Powerline Alliance Inc., "HomePlug AV White Paper," Doc. Ver. No. HPAVWP-050818, Aug. 2005, pp. 1-11.

International Search Report and Written Opinion—PCT/US2008/065811, International Searching Authority, European Patent Office, Nov. 25, 2008.

International Search Report and Written Opinion—PCT/US2008/065831, International Searching Authority, European Patent Office, Feb. 20, 2008, 22 pages.

Katar et al., "Beacon Schedule Persistence to Mitigate Beacon Loss in HomePlug AV Networks," May 2006, IEEE 1-4244-0113-05/06, pp. 184-188.

Lee et al., "HomePlug 1.0 Powerline Communication LANs—Protocol Description and Performance Results version 5.4," 2000, International Journal of Communication Systems, 2000 00: 1-6, pp. 1-25.

Loh et al, Quality of Support and priority Management in HomePNA 2.0 Link Layer, IEEE, 6 pages, 2003.

Notification of First Office Action, The State Intellectual Property Office of the People's Republic of China, issued in Chinese Application No. 200610107587.1, dated Oct. 11, 2010, 6 pages.

Notification of Reasons for Rejection, Japanese Patent Office, issued in Japanese Patent Application No. 2006-205200, dated Jan. 18, 2011, 3 pages.

Opera Specification—Part 1: Technology, Open PLC European Research Alliance, 198 pages, 1006.

"U.S. Appl. No. 12/108,334 Office Action", Aug. 3, 2012, 18 pages.
"U.S. Appl. No. 12/133,315 Office Action", Aug. 9, 2012, 37 pages.
Notification of First Office Action, The State Intellectual Property Office of the People's Republic of China, issued in Chinese Application No. 200880100486.9, Nov. 21, 2012, 17 pages.
U.S. Appl. No. 13/303,913 Office Action, Dec. 26, 2012, 37 pages.
U.S. Appl. No. 11/970,339 Final Office Action, Dec. 11, 2012, 25 pages.
"U.S. Appl. No. 11/970,297 Final Office Action", Apr. 16, 2012, 32 pages.
"US Appl. No. 12/133,301 Office Action", Mar. 1, 2012, 38 pages.
Co-Pending U.S. Appl. No. 13/113,474, filed May 23, 2011, 32 pages.
"U.S. Appl. No. 11/970,271 Final Office Action", Jul. 19, 2011, 21 pages.
"U.S. Appl. No. 11/970,271 Office Action", Mar. 9, 2012, 19 pages.
"U.S. Appl. No. 11/970,271 Office Action", Oct. 7, 2011, 20 pages.
"U.S. Appl. No. 11/970,271 Office Action", Dec. 7, 2010, 21 pages.
"U.S. Appl. No. 11/970,297 Office Action", Mar. 30, 2011, 30 pages.
"U.S. Appl. No. 11/970,297 Office Action", Sep. 29, 2011, 31 pages.
"U.S. Appl. No. 11/970,323 Office Action", Dec. 7, 2010, 12 pages.
"U.S. Appl. No. 11/970,339 Final Office Action", Jul. 7, 2011, 14 pages.
"U.S. Appl. No. 11/970,339 Office Action", Jan. 19, 2011, 22 pages.
"U.S. Appl. No. 11/971,446 Final Office Action", Jul. 1, 2011, 17 pages.
"U.S. Appl. No. 11/971,446 Office Action", Feb. 15, 2011, 20 pages.
"U.S. Appl. No. 12/108,334 Final Office Action", Jun. 14, 2011, 28 pages.
"U.S. Appl. No. 12/108,334 Office Action", Aug. 3, 2010, 20 pages.
"U.S. Appl. No. 12/108,334 Office Action", Feb. 16, 2011, 26 pages.
"U.S. Appl. No. 12/133,270 Final Office Action", Nov. 18, 2011, 23 pages.
"U.S. Appl. No. 12/133,270 Office Action", Jun. 3, 2011, 67 pages.
"U.S. Appl. No. 12/133,301 Final Office Action", Mar. 22, 2011, 39 pages.
"U.S. Appl. No. 12/133,301 Office Action", Sep. 22, 2010, 42 pages.
"U.S. Appl. No. 12/133,312 Final Office Action", Feb. 16, 2011, 24 pages.
"U.S. Appl. No. 12/133,312 Office Action", Jun. 8, 2011, 24 pages.
"U.S. Appl. No. 12/133,312 Office Action", Jul. 28, 2010, 29 pages.
"U.S. Appl. No. 12/133,315 Final Office Action", Jul. 20, 2010, 30 pages.
"U.S. Appl. No. 12/133,315 Final Office Action", Jun. 9, 2011, 38 pages.
"U.S. Appl. No. 12/133,315 Office Action", Dec. 24, 2009, 28 pages.
"U.S. Appl. No. 12/133,315 Office Action", Dec. 28, 2010, 36 pages.
"U.S. Appl. No. 11/970,339 Office Action", Jun. 18, 2012, 26 pages.
Muir A., et al., "An Efficient Packet Sensing MAC Protocol for Wireless Networks", Computer Engineering Department School of Engineering, University of California, Aug. 1998, pp. 20.
U.S. Appl. No. 12/133,301 Final Office Action, Sep. 26, 2012, 54 pages.
"U.S. Appl. No. 13/113,474 Office Action", Jun. 17, 2013, 10 pages.
"U.S. Appl. No. 11/970,339 Office Action", Jun. 27, 2013, 22 pages.

* cited by examiner

MANAGING COMMUNICATIONS OVER A SHARED MEDIUM

RELATED APPLICATIONS

This application is a utility application claiming priority to U.S. Provisional Application Ser. No. 60/941,949, entitled "MANAGING COMMUNICATIONS OVER A SHARED MEDIUM," filed on Jun. 4, 2007, which is hereby incorporated by reference.

TECHNICAL FIELD

The invention relates to managing communications over a shared medium.

BACKGROUND

A network of communication stations can share a communication medium (e.g., wires connecting multiple stations or spectrum for transmitting radio signals among stations) using any of a variety of access techniques. Some access techniques (e.g., carrier sense multiple access (CSMA) techniques) include a contention period in which stations contend for use of the medium for transmitting a signal by sensing when the medium is idle. In CSMA techniques, "collisions" sometimes occur when signals from two or more stations overlap. Some CSMA techniques attempt to detect collisions and abort transmission to reduce the negative impact of collisions (e.g., CSMA/CD techniques). Some channel access techniques can also provide a time division multiple access (TDMA) period in which a specific station or stream is provided exclusive control of the medium. Typical TDMA and CSMA channel access techniques are used to share medium between stations of the same type. However, in environments where stations or networks of different types are present, a common means of efficiently detecting the presence of various networks and appropriately segregating traffic between them becomes necessary.

SUMMARY

Systems, methods and computer readable media of this disclosure provide for allocation of bandwidth among networks. Methods providing an allocation of bandwidth between network can include: receiving requests for bandwidth allocation from each of the plurality of foreign networks with whom a local network is sharing bandwidth; generating a coexistence frame requesting an allocation of bandwidth for a local network, the allocation being based upon the requests for allocation received from the plurality of foreign networks with whom the local network is sharing bandwidth; transmitting the coexistence frame to the plurality of foreign networks with whom the local network is sharing the bandwidth, the coexistence frame utilizing a periodically occurring coexistence slot; and waiting a reservation period comprising a number of periodically occurring coexistence slots before transmitting during the allocation of bandwidth requested by the local network.

Other methods allocating bandwidth between networks can include transmitting a coexistence frame from a plurality of networks by utilizing a periodically occurring coexistence slot; wherein the coexistence frame is utilized for negotiating and reserving a medium for transmission by a network.

Various other aspects of this disclosure will be found in the detailed description, drawings, and claims.

DETAILED DESCRIPTION

There are a many possible implementations of the invention, some example implementations are described below. However, such examples are descriptions of various implementations, and not descriptions of the invention, which is not limited to the detailed implementations described in this section but is described in broader terms in the claims.

Figure 1:
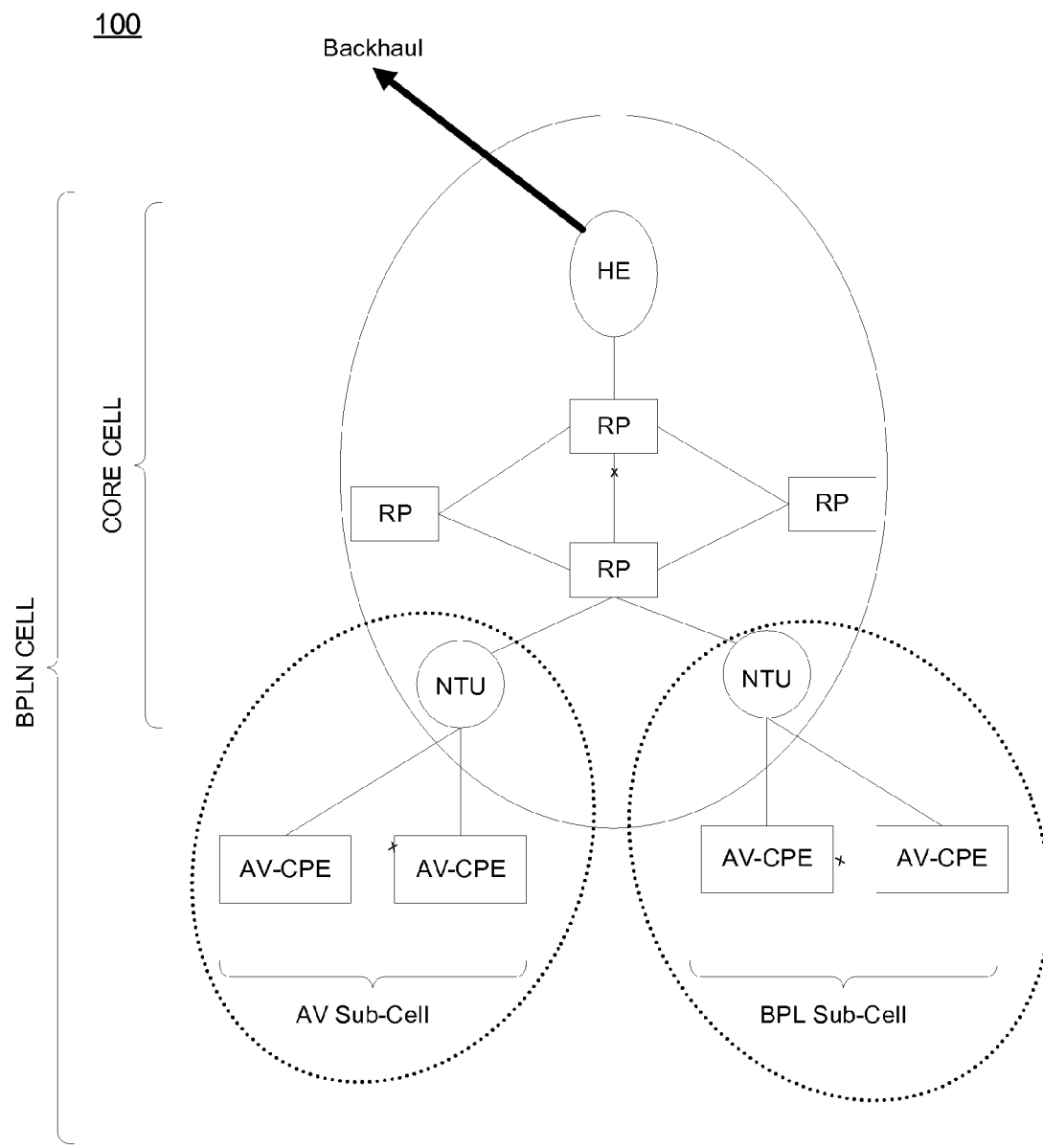
FIG. 1 is a block diagram of a communication network topology.

FIG. 1 shows an exemplary network configuration for an access network 100 such as a broadband power line Network (BPLN) that provides access to a backhaul network. The BPLN can be managed by a service provider entity having access to the underlying physical power line medium. BPLN is a general purpose network that can be used for several types of application including, smart grid management, broadband internet access, voice and video delivery services, etc. BPLN can be deployed on low voltage, medium voltage and high voltage power lines. BPLN can span the entire neighborhood or it may be deployed within a single Multi-dwelling Unit. For example, it can be used to provide network service to tenants in a single apartment building. While power lines are one medium for deploying the BPLN, the network can also be deployed on other wire lines like coaxial cables, twisted pair or a combination of these.

A BPLN can include one or more Cells. A cell is a group of broadband power line (BPL) devices in a BPLN that have similar characteristics such as association management, security, quality of service (QoS) and channel access settings, for example. Cells in a BPLN are logically isolated from each other, and communication to and from the backhaul occurs within the cell. Each cell in a BPLN includes a Core-Cell and may also include one or more Sub-Cells. There can be more than one cell on a given physical power line medium.

A Core-Cell includes a group of devices in a BPLN that includes a Head End (HE), Repeaters (RP), and Network Termination Units (NTU), but excludes Customer Premise Equipment (CPE). The Head End (HE) is a device that bridges a cell to the backhaul network. At a given time, a cell will have one active Head End and the Head End manages the cell including the Core-Cell and any associated Sub-Cells. A Repeater (RP) is a device that selectively retransmits MAC Service Data Units (MSDUs) to extend the effective range and bandwidth of the BPLN Cell. Repeaters also perform routing and QoS functions. The Network Termination Unit (NTU) is a device that connects a BPLN cell to the end users' network or devices. The NTU may in some cases bridge to other network technologies such as WiFi. A single NTU may serve more than one customer. Each Sub-Cell is associated with an active NTU. It can be noted that HE, NTU and RP are various roles of a station. In some implementations, a single device may be designed to play multiple roles. For example, a single device can simultaneously perform the functions of both a RP and NTU.

Various types of CPE devices are the endpoint nodes in the network and communicate with other nodes in the network through the NTU. Each node in the network communicates as a communication "station" (STA) using a physical (PHY) layer protocol that is used by the nodes to send transmissions to any other stations that are close enough to successfully receive the transmissions. STAs that cannot directly communicate with each other use one or more repeater STAs to communicate with each other.

Any of a variety of communication system architectures can be used to implement the portion of the network interface module that converts data to and from a signal waveform that is transmitted over the communication medium. An application running on a station provides and receives data to and from the network interface module. A MSDU is a segment of information received by the MAC layer. MAC layer processes the received MSDUs and generates "MAC Protocol Data Units" (MPDUs). A MPDU is a segment of information including header and payload fields that the MAC layer has asked the PHY layer to transport. An MPDU can have any of a variety of formats based on the type of data being transmitted. A "PHY Protocol Data Unit (PPDU)" refers to the modulated signal waveform representing an MPDU that is transmitted over the power line by the PHY layer.

Apart from generating MPDUs from MSDUs, MAC layer can provide several functions including channel access control, providing the required QoS for the MSDUs, retransmission of corrupt information, routing and repeating. Channel access control can enable stations to share the powerline medium. Several types of channel access control mechanisms can be used by the MAC, including, for example, carrier sense multiple access with collision avoidance (CSMA/CA), centralized Time Division Multiple Access (TDMA), distributed TDMA, token based channel access, etc. Similarly, a variety of retransmission mechanisms can also be used. The PHY layer can also use a variety of techniques to enable reliable and efficient transmission over the transmission medium (power line, coax, twisted pair etc). Various modulation techniques like Orthogonal Frequency Division Multiplexing (OFDM), Wavelet modulations can be used. Forward error correction (FEC) code line Viterbi codes, Reed-Solomon codes, concatenated code, turbo codes, low density parity check code, etc., can be employed by the PHY to overcome errors. Some implementations of the MAC and PHY layers used by a powerline medium can be based on HomePlug AV specification.

In some implementations, the PHY uses OFDM modulation. Using OFDM modulation, data are transmitted in the form of OFDM "symbols." Each symbol has a predetermined time duration or symbol time Ts. Each symbol is generated from a superposition of N sinusoidal carrier waveforms that are orthogonal to each other and form the OFDM carriers. Each carrier has a peak frequency fi and a phase $\phi_i$ measured from the beginning of the symbol. For each of these mutually orthogonal carriers, a whole number of periods of the sinusoidal waveform is contained within the symbol time Ts. Equivalently, each carrier frequency is an integral multiple of a frequency interval $\Delta f=1/Ts$. The phases $\phi_i$ and amplitudes Ai of the carrier waveforms can be independently selected (according to an appropriate modulation scheme) without affecting the orthogonality of the resulting modulated waveforms. The carriers occupy a frequency range between frequencies f1 and fN referred to as the OFDM bandwidth.

Figure 2:
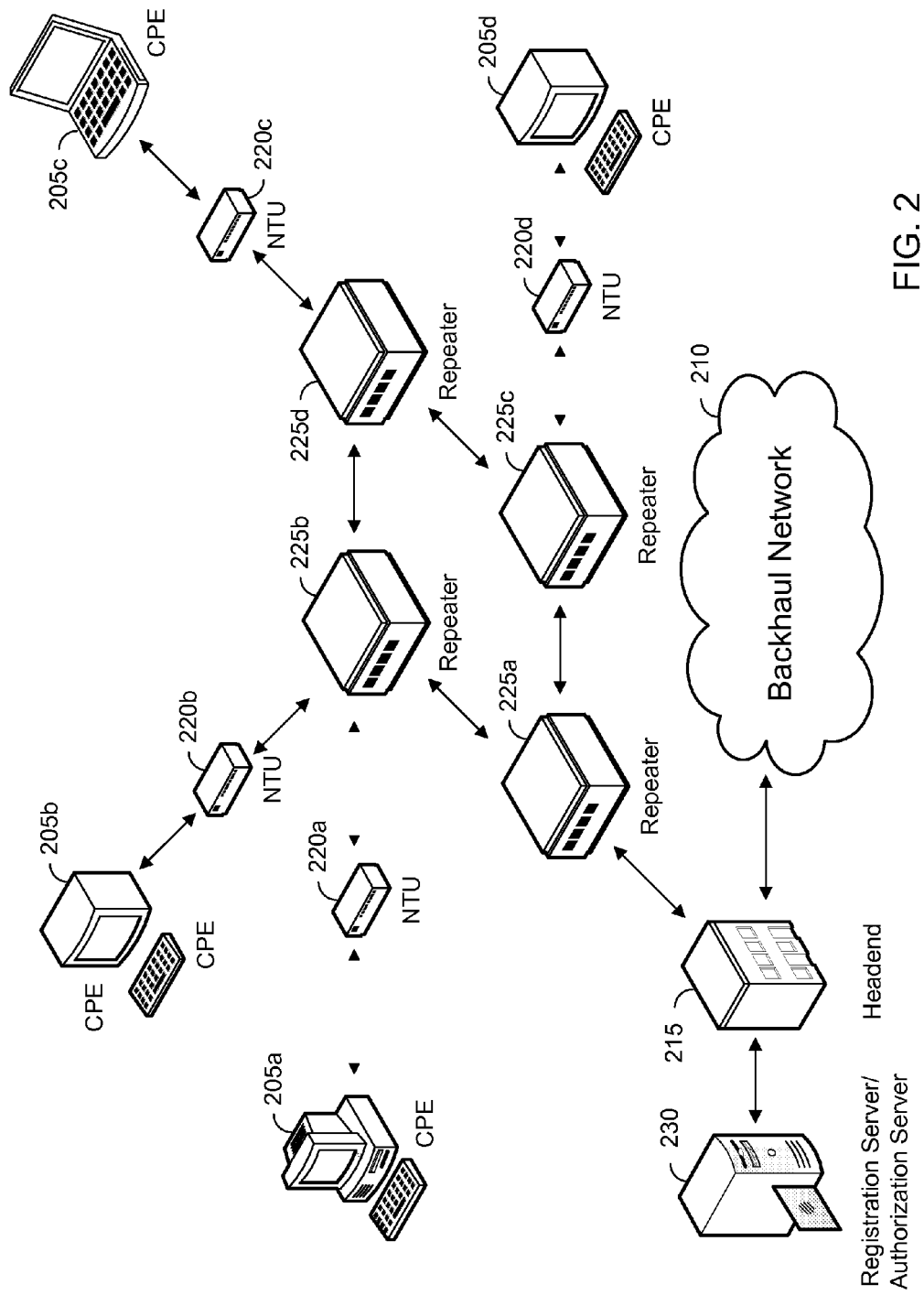
FIG. 2 is a block diagram of a communication system for communicating over the network.

FIG. 2 is a block diagram of a powerline communication network. In various implementations, a powerline communication network can enable customer premises equipment (CPE) devices 205a-d to access a backhaul network 210 through a gateway (e.g., a headend server 215). In various implementations, there can be multiple gateways to the backhaul network 210. For example, it can be inefficient for a CPE device in one city to be required to send a signal to another city prior to accessing the backhaul network 210 (e.g., the Internet).

The CPE devices 205a-d can communicate with the headend 215 through a network of network termination units 220a-d and repeaters 225a-d. In some implementations, the network termination units can operate to translate the data signals from the CPE devices in any of a variety of communications protocols onto a powerline network. For example, a CPE 205a-d might communicate with an NTU 220a-d using a IEEE 802.11 wireless protocol, and the NTU 220a-d can convert the wireless signal to a signal suitable for transmission on a powerline medium. Systems for transmitting and receiving powerline network signals are further described in FIG. 3.

In various implementations, repeaters 225a-d can be located throughout the powerline network to provide the ability for a data signal to travel on the powerline carrier medium over long distances. As discussed above, the headend 215 can provide a gateway for the data signal to be transferred to a backhaul network 210. For example, the headend 215 can extract the data signal from the powerline network and convert the signal for transmission on a packet switched network such as the Internet. In various implementations, one or more of the repeaters 225a-d can be equipped to transfer the signal from the powerline network to the backhaul network 210.

In some implementations, the headend 215 can also include an authorization server. Other implementations include the Authorization Server within the Backhaul Network 210. The authorization server can be operable to authenticate CPE devices 205a-d for transmission of data over the powerline network. When a CPE device 205a-d is not authenticated, in various implementations, the CPE device 205a-d can be provided access to a registration server 230. The registration server 230, in various implementations, can enable the user of a CPE device 205a-d to register the CPE device 205a-d with the network to obtain access to the powerline network.

In various implementations, the registration server 230 can provide a limited registration to a CPE device 205a-d to try the powerline network. For example, the registration can be limited by a period of time, bandwidth, destination address, or any other limitation that might allow the user to have limited access to the network. In additional implementations, the registration server 230 can require payment prior to using the network. For example, the registration server can provide web pages operable to collect payment information from the user. In various implementations, the registration server can allow the user to pay for any of a variety of different access plans. For example, an access plan might allow a user to purchase access for a specified period of time, at a specified bandwidth, or combinations thereof. In various implementations, the Registration. Server is not co-located with the Authorization Server. In other implementations, the Registration Server and Authorization Server are co-located as shown in FIG. 2. In various implementations, the Registration Server can be part of the Backhaul Network 201.

Figure 3:
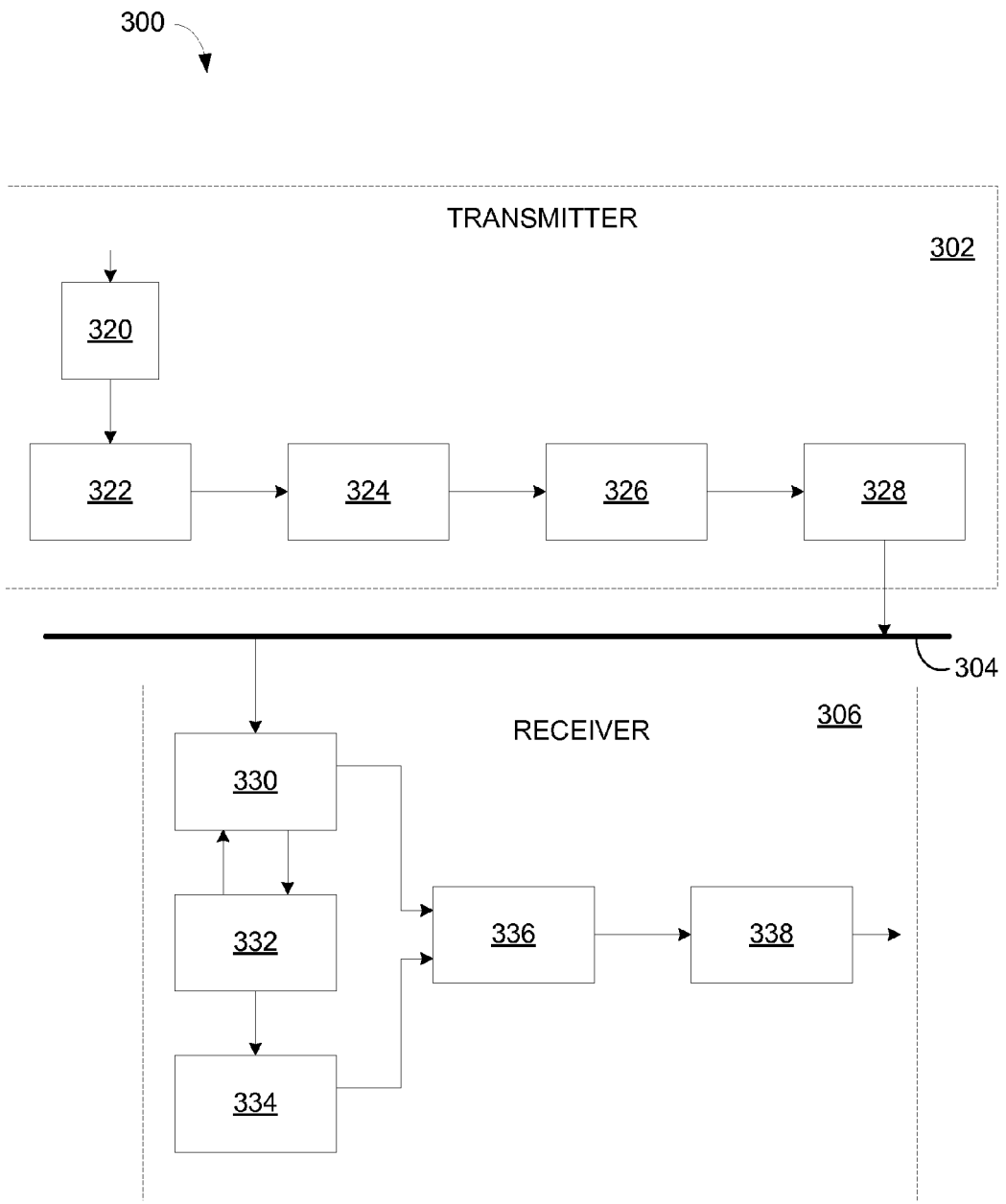
FIG. 3 is a block diagram illustrating components associated with devices communicating over the access network.

Referring to FIG. 3, a communication system 300 includes a transmitter 302 for transmitting a signal (e.g., a sequence of OFDM symbols) over a communication medium 304 to a receiver 306. The transmitter 302 and receiver 306 can both be incorporated into a network interface module at each station. The communication medium 304 can represent a path from one device to another over the power line network.

At the transmitter 302, modules implementing the PHY layer receive an MPDU from the MAC layer. The MPDU is sent to an encoder module 320 to perform processing such as scrambling, error correction coding and interleaving.

The encoded data is fed into a mapping module 322 that takes groups of data bits (e.g., 1, 2, 3, 4, 6, 8, or 10 bits), depending on the constellation used for the current symbol (e.g., a BPSK, QPSK, 8-QAM, 16-QAM constellation), and maps the data value represented by those bits onto the corresponding amplitudes of in-phase (I) and quadrature-phase (Q) components of a carrier waveform of the current symbol. This results in each data value being associated with a corresponding complex number $C_i = A_i \exp(j\phi_i)$ whose real part corresponds to the I component and whose imaginary part corresponds to the Q component of a carrier with peak frequency fi. Alternatively, any appropriate modulation scheme that associates data values to modulated carrier waveforms can be used.

The mapping module 322 also determines which of the carrier frequencies f1, ..., fN within the OFDM bandwidth are used by the system 300 to transmit information. For example, some carriers that are experiencing fades can be avoided, and no information is transmitted on those carriers. Instead, the mapping module 322 uses coherent BPSK modulated with a binary value from the Pseudo Noise (PN) sequence for that carrier. For some carriers (e.g., a carrier i=10) that correspond to restricted bands (e.g., an amateur radio band) on a medium 304 that may radiate power no energy is transmitted on those carriers (e.g., A10=0). The mapping module 322 also determines the type of modulation to be used on each of the carriers (or "tones") according to a "tone map." The tone map can be a default tone map, or a customized tone map determined by the receiving station, as described in more detail below.

An inverse discrete Fourier transform (IDFT) module 324 performs the modulation of the resulting set of N complex numbers (some of which may be zero for unused carriers) determined by the mapping module 322 onto N orthogonal carrier waveforms having peak frequencies f1, ..., fN. The modulated carriers are combined by IDFT module 324 to form a discrete time symbol waveform S(n) (for a sampling rate fR), which can be written as $$S(n) = \sum_{i=1}^{N} A_i \exp[j(2\pi i n / N + \Phi_i)] \quad \text{Eq. (1)}$$

where the time index n goes from 1 to N, Ai is the amplitude and φi is the phase of the carrier with peak frequency fi=(i/N) fR, and $j=\sqrt{-1}$. In some implementations, the discrete Fourier transform corresponds to a fast Fourier transform (FFT) in which N is a power of 2.

A post-processing module 326 combines a sequence of consecutive (potentially overlapping) symbols into a "symbol set" that can be transmitted as a continuous block over the communication medium 304. The post-processing module 326 prepends a preamble to the symbol set that can be used for automatic gain control (AGC) and symbol timing synchronization. To mitigate intersymbol and intercarrier interference (e.g., due to imperfections in the system 300 and/or the communication medium 304) the post-processing module 326 can extend each symbol with a cyclic prefix that is a copy of the last part of the symbol. The post-processing module 326 can also perform other functions such as applying a pulse shaping window to subsets of symbols within the symbol set (e.g., using a raised cosine window or other type of pulse shaping window) and overlapping the symbol subsets.

An Analog Front End (AFE) module 328 couples an analog signal containing a continuous-time (e.g., low-pass filtered) version of the symbol set to the communication medium 304. The effect of the transmission of the continuous-time version of the waveform S(t) over the communication medium 304 can be represented by convolution with a function g(τ; t) representing an impulse response of transmission over the communication medium. The communication medium 304 may add noise n(t), which may be random noise and/or narrowband noise emitted by a jammer.

At the receiver 306, modules implementing the PHY layer receive a signal from the communication medium 304 and generate an MPDU for the MAC layer. An AFE module 330 operates in conjunction with an Automatic Gain Control (AGC) module 332 and a time synchronization module 334 to provide sampled signal data and timing information to a discrete Fourier transform (DFT) module 336.

After removing the cyclic prefix, the receiver 306 feeds the sampled discrete-time symbols into DFT module 336 to extract the sequence of N complex numbers representing the encoded data values (by performing an N-point DFT). Demodulator/Decoder module 338 maps the complex numbers onto the corresponding bit sequences and performs the appropriate decoding of the bits (including deinterleaving and descrambling).

Any of the modules of the communication system 300 including modules in the transmitter 302 or receiver 306 can be implemented in hardware, software, or a combination of hardware and software.

Various stations in a network may generate regular beacon transmissions for various purposes. A beacon transmission (or simply a "beacon") includes management information that can be used for a variety of purposes. The stations may communicate with each other in time periods between beacon transmissions, provided the power line channel characteristics between any two communicating stations permit it.

One of the functions of a beacon transmission is to carry medium allocation (or scheduling) information. The scheduling information can allocate some of the time between beacon transmissions as a contention period during which stations may contend for access to the power line medium. The scheduling information can also allocate a contention-free period during which times slots are assigned to particular stations for access to the power line medium. The scheduling information is provided relative to a TDMA Scheduling Period Start Time (or TDMA Period Start Time).

The TDMA Period start time is synchronized with respect to the AC line cycle of the power line waveform such that the time between consecutive TDMA period start times is based on the underlying AC line cycle frequency. Thus, to the extent that the AC line cycle frequency varies, the TDMA period start time (and hence the duration of each TDMA Period) may not be perfectly periodic. Since the beacons transmitted by the HE may not be heard by every station, each station transmits its own beacon to relay the information in the beacon to stations that do not hear the HE. While the stations may transmit their beacons at different times, the TDMA period start time is established with respect to the information contained in the beacons transmitted by the HE. At each station, the TDMA period start time can be synchronized to that of the HE using a start time synchronization procedure described in more detail below. Each station can then predict a given TDMA period end time (or future TDMA period start time) based on the synchronized start time and the local AC line cycle at the given station by correlating the synchronized start time to a detectable feature of the power line waveform such as a zero crossing. The TDMA period can be set by the HE to any multiple of a half of the AC line cycle period, for example, by waiting for a given number of zero crossings.

In some cases it is desirable to increase the TDMA period to make more efficient use of the medium by reducing the percentage of time devoted to sending the "overhead" information in the beacon transmission. There is also overhead information associated with transmissions from the stations during each TDMA Period. It may also be desirable to keep the beacon period small enough to provide a desired number of transmission opportunities in a given length of time to reduce the latency. Thus, the TDMA period can be selected according to a trade-off between keeping overhead low and latency between transmission opportunities low. For example, in some implementations the TDMA period is selected to be twice the AC line cycle period. In this case, when operating in power line environments with an AC line cycle frequency of 60 Hz, the TDMA period would be approximately 33.33 msec. When operating in power line environments with an AC line cycle frequency of 50 Hz, the TDMA period would be approximately 40 msec. Variations in the TDMA period may occur due to drift in the AC line cycle frequency. The HE determines the duration of the TDMA period as well as the start time of the TDMA period.

Figure 4:
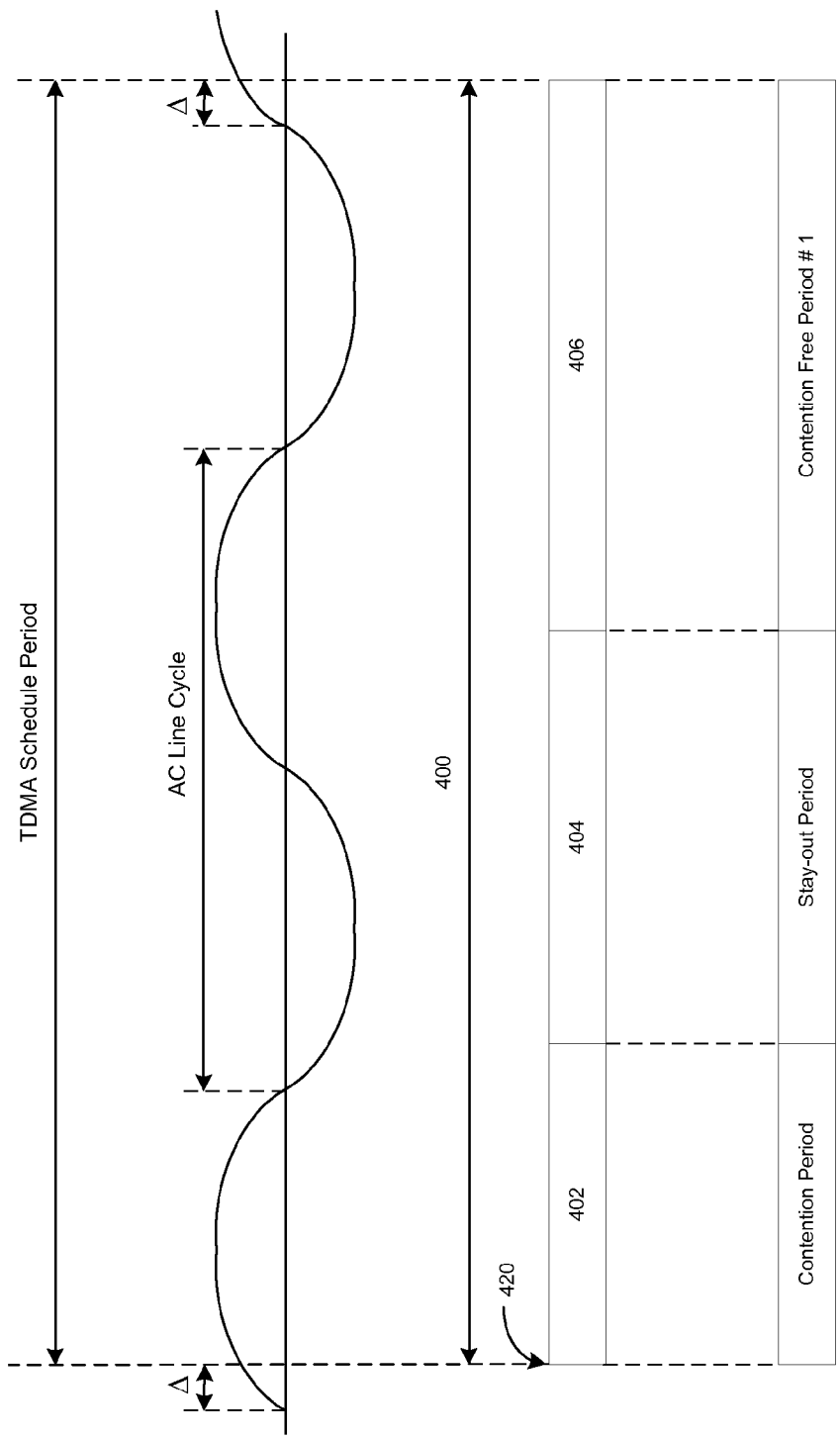
FIG. 4 is a timing diagram of a beacon period.

FIG. 4 shows the structure of an exemplary TDMA period 400 which consists of a Contention Period 402 followed by a Stay-out Period 404 and a Contention Free Period 406. In general, a TDMA period can contain any number of Contention Periods, Stay-out Periods and Contention Free Periods in any order. The TDMA period may also be different for different stations in the BPLN. The Contention Period 402 is a time in which stations can contend for permission to transmit using a shared medium access protocol such as CSMA/CA. The Stay-out Period 404 is a time during which stations are not allowed to transmit. The Contention Free Period 406 can include time slots assigned for use by predetermined stations (e.g., using a Time Domain Multiple Access (TDMA) protocol). Beacons are typically transmitted during the Contention Period. Beacon may also be transmitted during Contention Periods. The frequency of beacon transmission depends on how frequently the associated management information needs to be communicated. Typically, beacons can be transmitted once in several TDMA periods.

In networks in which repeaters are used to extend the reach of signals in the network, multiple stations can retransmit beacons transmissions to be heard by stations that would otherwise not be able to receive the beacons transmissions from the HE.

Figure 5:
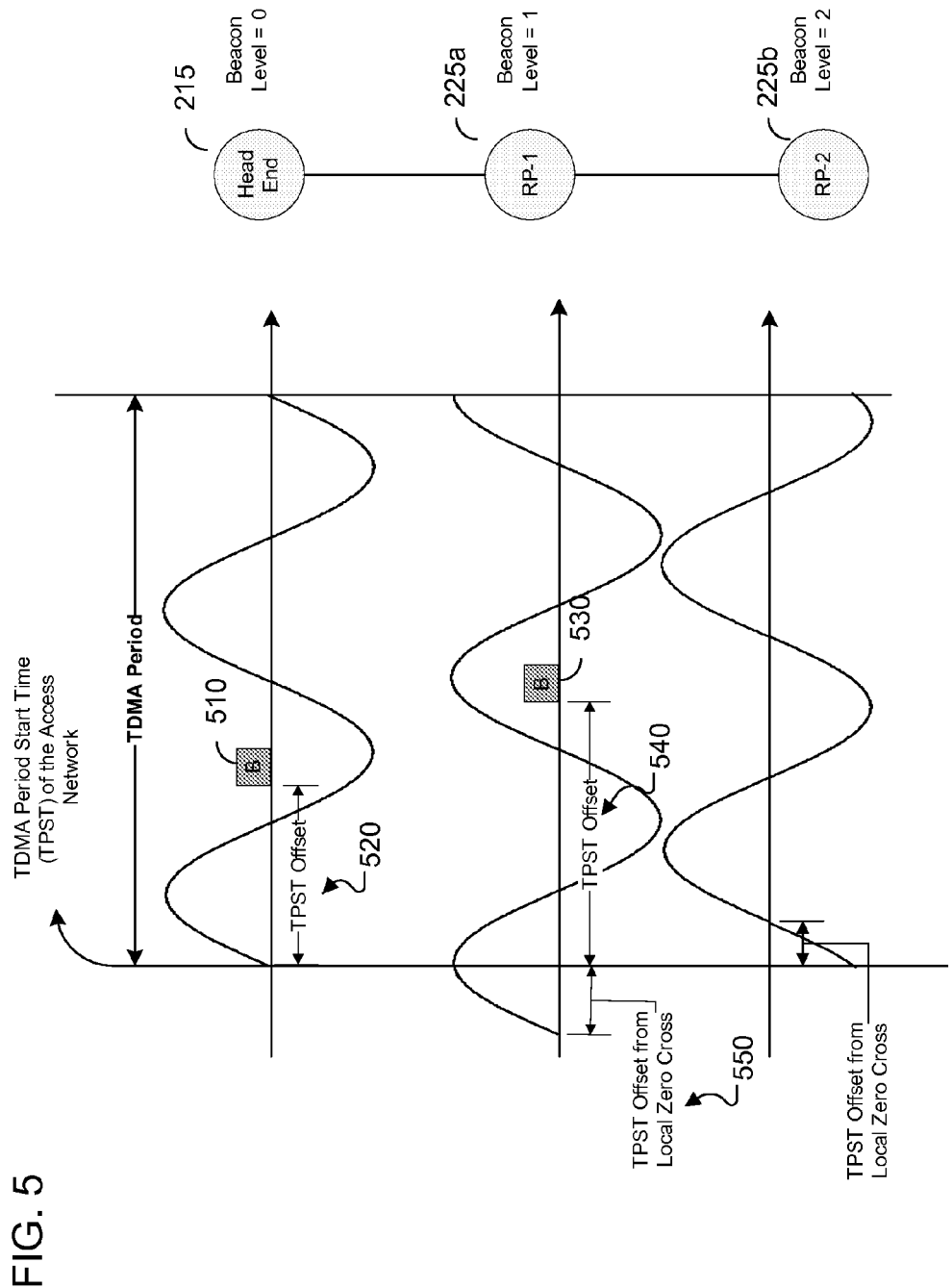
FIG. 5 is a timing diagram illustrating synchronization of devices using a beacon period start time offset.

FIG. 5 is a timing diagram illustrating synchronization of multiple levels of stations using a beacon signal. In some implementations, the headend 215 can originate a beacon signal 510. The beacon signal 510 can include a TDMA period start time (TPST) offset 520. The TSPT offset 520 can indicate the time period between the start time of the TDMA period and the time at which the corresponding beacon is transmitted. A repeater 225a can receive the beacon signal 510. Based upon the beacon signal 510, the repeater 225a can synchronize its clock to the headend.

However, as can be seen with respect to FIG. 2, the beacon signal generated by the headend is not received by each of the repeater devices (e.g., repeater devices 225-b-d). Thus, the repeater devices that receive the beacon signal can generate a local beacon signal 530. The local beacon signal 530 can include a TPST offset 540 that corresponds to the derived synchronization from the headend 215 zero crossing as well as a local TPST offset 550 from the local repeater's (repeater 225a) zero crossing. A second level repeater 225b, upon receiving the beacon signal 530 from the first level repeater device 225a, can derive synchronization with the headend 215 based upon the beacon signal 530. In some implementations, the synchronization can be derived based upon TPST offset 540 and local TPST offset 550.

In various implementations, the local beacon signals can be generated by any station in the network, including the NTUs (e.g., NTUs 220a-e of FIG. 2) and/or CPEs (e.g., CPEs 205a-d of FIG. 2). Thus, the headend's TDMA period start time can be communicated to every station in an access network. Such synchronization of the TDMA Period start time throughout the network can be used to facilitate time-based access to the access network, for example, by using time division multiple access (TDMA) protocols.

In some implementations, the access network can facilitate coexistence networks. In such implementations, the access media can be shared, for example, by using a time based access sharing plan. In some implementations, the access network can provide half of a TDMA period for use by the access network stations, and the remainder of the TDMA period for use by coexistence networks. In general, the sharing of the TDMA period can be divided in any proportion between access network and the coexistence network based on predetermined policy.

Figure 6:
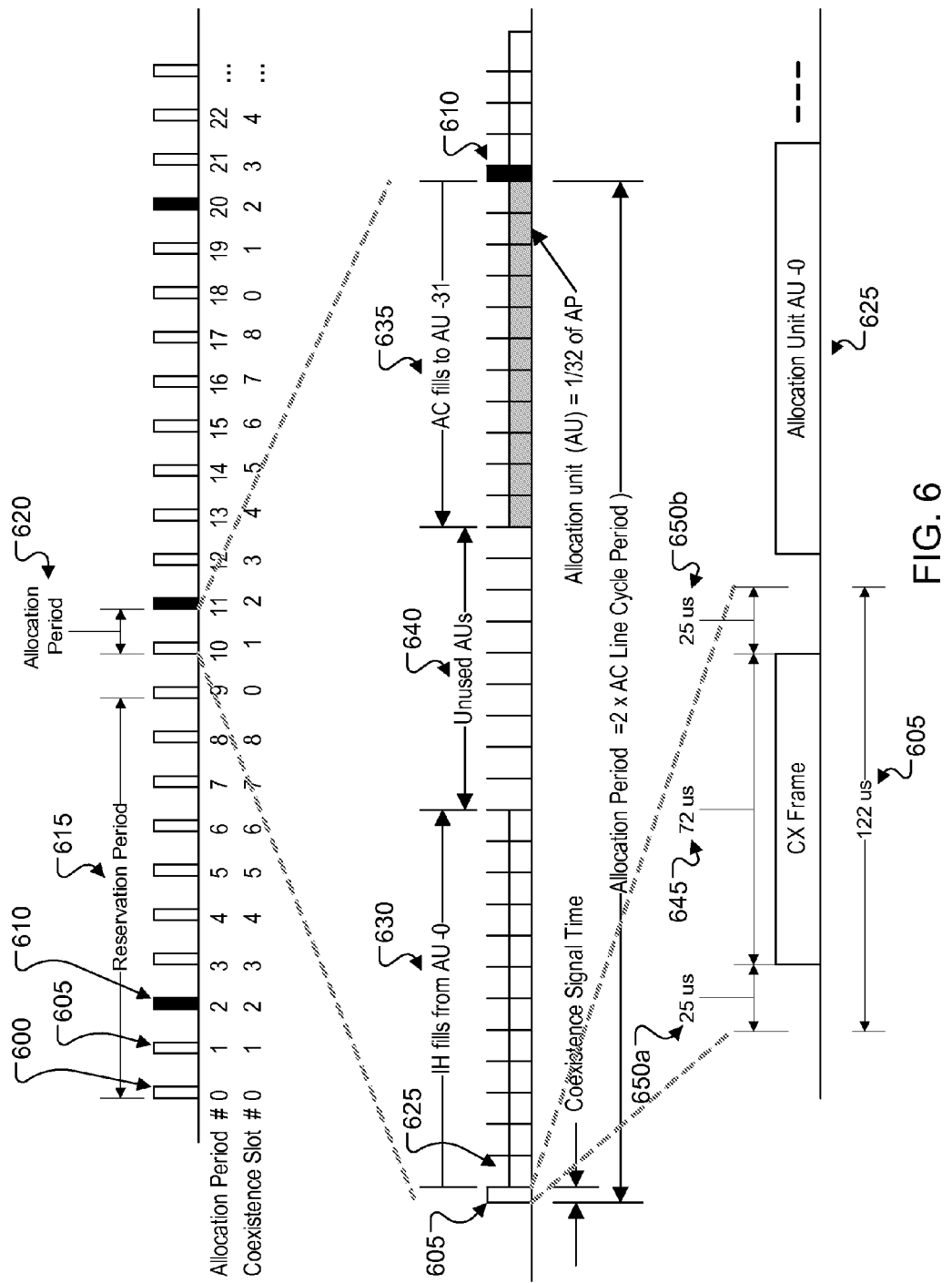
FIG. 6 is a timing diagram illustrating coexistence of in-home networks with an access network.

FIG. 6 is a timing diagram illustrating coexistence of in-home networks with an access network. The timing diagram illustrates multiple coexistence slots (e.g., coexistence slots 600, 605, 610). A first coexistence slot 600 can be reserved for an access network (e.g., including devices such as headend 215, repeaters 225a-d, NTUs 220a-d, and CPEs 205a-d of FIG. 2). In some implementations, the access network can broadcast a coexistence signal once every nine allocation periods 620. The coexistence signal can be used by the access network to reserve bandwidth (e.g., allocation unit 625) for devices included in the access network.

In some implementations, the coexistence slots 605, 610 can be assigned to foreign devices using the in-home power network to distribute signals. Upon connecting to the in-home network, a coexistence network can observe the network for a period of time and then request an apparently available coexistence slot 605, 610 and coexistence network identification (CNID). If the requested coexistence slot and CNID are available, the neighboring devices will provide an acknowledgement of the selection. If the requested coexistence slot and CNID are not available, the neighboring devices will reject the allocation or will not respond. The new coexistence network device can select another CNID and/or coexistence slot 605, 610 if the requested CNID and/or coexistence slot 605, 610 is not available.

The access network and the in-home devices can broadcast coexistence signals during the coexistence slots to reserve bandwidth (e.g., allocation units 625) for the foreign network devices on the network. In some implementations, the coexistence signal for a foreign network can be transmitted once every nine allocation periods 620. Transmission of a coexistence signal once every 9 allocation periods can enable up to 8 foreign networks (9 total coexistence slots–1 access network coexistence slot) to coexist with the access network. In other implementations, the coexistence signal for a foreign network can be transmitted once every 27 allocation periods. Transmission of a coexistence signal once every 27 allocation periods can enable up to 24 foreign networks (27 total coexistence slots–3 access network coexistence slots). In still further implementations, transmission of a coexistence signal once every 9 allocation periods and transmission of a coexistence signal once every 27 allocation periods can be combined. For example, some foreign networks might transmit a coexistence signal once every 9 allocation periods while other foreign networks might transmit a coexistence signal once every 27 allocation periods.

After broadcasting a reservation, the access network or the foreign network can wait a reservation period 615 before using the requested bandwidth, thereby enabling one or more foreign networks or the access network to reject the requested allocation. In some implementations, the access network can be provided a right to half of the allocation units (e.g., 16 allocation units per allocation period, in the example of FIG. 6), while the foreign network can be provided a right to the other half of the allocation units (e.g., 16 allocation units per allocation period). In some implementations, the reservation period can be equal to the time period between transmission of a coexistence signal from the access network. Thus, in the example of FIG. 6, a foreign network or access unit would broadcast the coexistence signal requesting a certain bandwidth allocation, and wait nine allocation periods before transmitting using the previously requested bandwidth allocation. For example, if the access network requested 11 allocation units of bandwidth during coexistence slot #0 600, the access network would wait until allocation period 10 before transmitting using the requested 11 allocation units. In such an example, while the foreign network devices could not reject the allocation since it is less than the 16 allocation units the access network is provided as a right, the reservation period delay in using those allocation units can serve to provide notice to the foreign networks that the bandwidth is being used.

In some implementations, the in-home (foreign networks) allocation units 630 can be filled from AU-0, while the access network allocation units 635 can be filled from AU-31. Any unused allocation units 640 are thereby located in the middle of the allocation period.

In some implementations, the access network or the foreign networks can request more than 50% of the bandwidth (e.g., more than 16 allocation units). For example, if the allocation unit is overloaded, while the foreign networks are underloaded, the access network can transmit a coexistence signal requesting 18 allocation units (e.g., AU-14 through AU-31). Because the foreign networks are underloaded, none of the foreign networks will reject the allocation request, and the access network can begin using the extra allocation units after the reservation period 615, thereby giving the foreign networks a chance to reject the allocation. If both the foreign networks and the access network are overloaded, each network can transmit requests for bandwidth greater than 50%, but such allocation will be rejected by the access network or by the foreign network. In such an example, each network will transmit using the 50% of the bandwidth as provided by rule. Other default allocations can be used.

A coexistence slot (e.g., coexistence slot 605) can include a coexistence signal. In some implementations, the coexistence signal can be 122 µs in length and can include buffers 650*a-b* of 25 µs each, and a coexistence frame 645 of 72 µs. The buffers 650*a-b* can help to ensure that the coexistence frame does not run into neighboring allocation units. In some implementations, the allocation units can be provided similar buffers to prevent a transmission during one allocation unit to interfere with transmission during another allocation unit or a coexistence frame 645.

Figure 7:
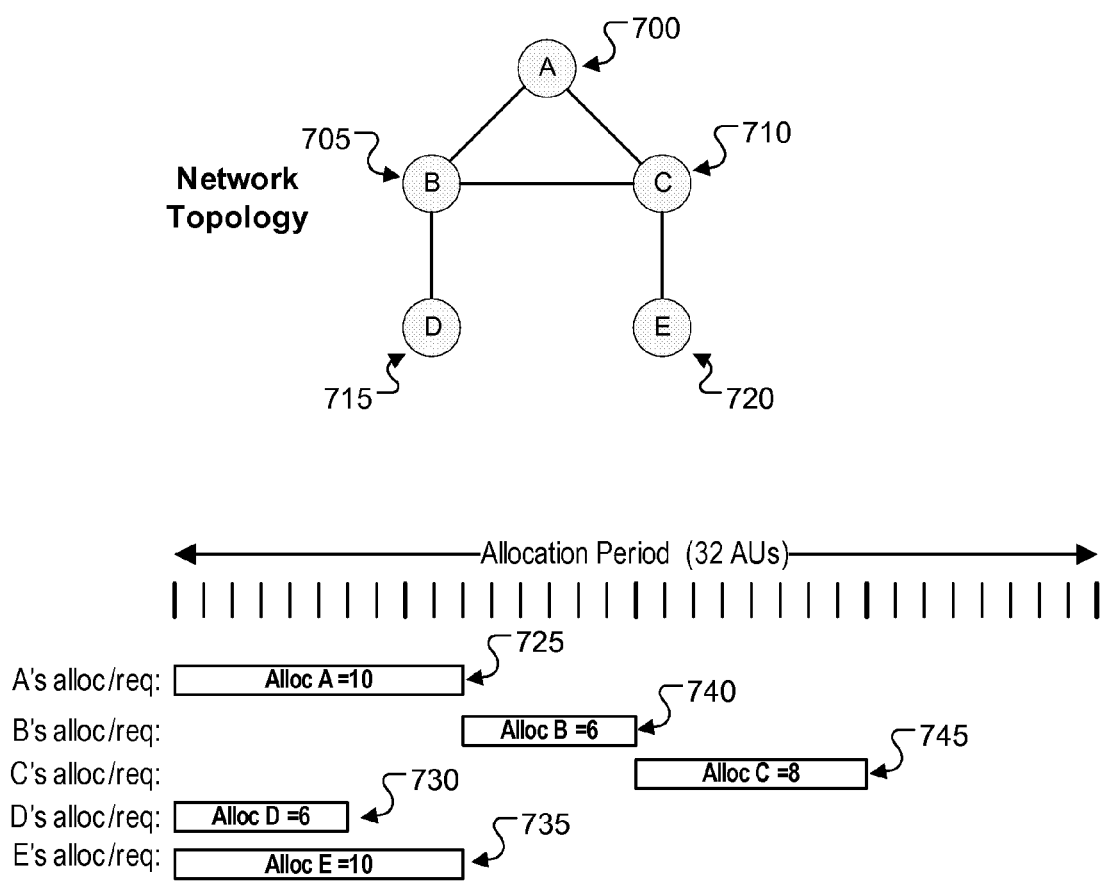
FIG. 7 is a network diagram showing an example assignment of allocation units.

FIG. 7 is a network diagram showing an example assignment of allocation units. In some network topologies, it can be difficult for an allocation of bandwidth to be received by neighboring devices. The network topology of FIG. 7 includes device A 700, device B 705, device C 710, device D 715 and device E 720. However, in this network topology, device A is unable to receive any allocations requested by device D 715 or device E 720. Similarly, device D is unable to receive any allocations requested by device A 700 or device E 720, while device E is unable to receive any allocations requested by device A 700 or device D 715.

In the example of FIG. 7, device A 700 might request the first 10 allocation units 725. Unaware of the request from device A 700, device D 715 might request the first 8 allocation units 730. Similarly unaware of the request from device A 700, and unaware of the request from device D 715, device E 720 might request the first ten allocation units 735. In contrast, device B 705, having received the allocation request 725 from device A 700, requests allocation of AU-10 through AU-15 740. Similarly, device C 710, having received the allocation request 725 from device A 700 and the allocation request 740 from device B 705, requests allocation of AU-16 through AU-24 745. Because the allocation request 730 from device D 715 and the allocation request 725 from device A 700 are both received by device B 705, device B can notify device D that the selected timeslot is already taken. Similarly, the allocation request 735 from device E 720 and the allocation request 725 from device A 700 are both received by device C 710. Device C 710 can notify device E 720 that the requested allocation 735 has been selected. Devices D and E 715, 720 can thereby send further allocation requests.

In some examples, there may exist multiple out-of-sync networks that should be re-synced. For example, the presence of two out-of-sync coexistences slots indicates the presence of two networks. The networks can generally operate out-of-sync indefinitely while the networks are independent (e.g., one node/network does not receive traffic from both networks. However, if a new node becomes aware of both networks, or a node associated with one of the network becomes aware of the other network, then a network or node that sees both co-existence frames will send a co-existence frame requesting a re-sync to the other group. In some implementations, when the re-sync request is received, the other group will abandon their coexistence slots and join the new group. Joining the new group can typically include restarting the process allocating the coexistence slots to the in-home network.

In those instances where a new node detects multiple networks, the new node can choose to join one network, and initiate a re-sync request to the other network. The choice of which network to join can be based on whether one group is the access network. In some implementations, when one network is the access network, the new node will join the access network and instruct the other network(s) to re-sync. In those instances where multiple in-home networks are detected without an access network, in some implementations, the new node can choose to join the in-home network for which the coexistence frame is more reliably received. In some implementations, the access can be accorded priority over all in-home networks. In such implementations, the access network will not re-sync. If one of the two groups is synchronized to the access group, the other group will have to be re-synched.

In those implementations where the access network is accorded priority, when the access network is present, it will determine the start of the coexistence slot. The remaining plurality of in-home networks will then synchronize the start of coexistence slots to that of the access slots. If the access network is not present, one of the in-home networks will serve as a "proxy access network" in determining the start of the coexistence slot. When a proxy access network is present, all other in-home networks will then synchronize the start of coexistence slots to that of the proxy access network. The presence of a proxy access network can be indicated by marking the coexistence frame as a proxy coexistence frame. For example, marking the coexistence frame can include setting a bit within the coexistence frame to indicate that the frame is a proxy coexistence frame. Thus, if the real access network is ever detected by one of the nodes associated with the proxy access network, the node will join the real access network and initiate a re-sync request to the proxy access network.

Figure 8:
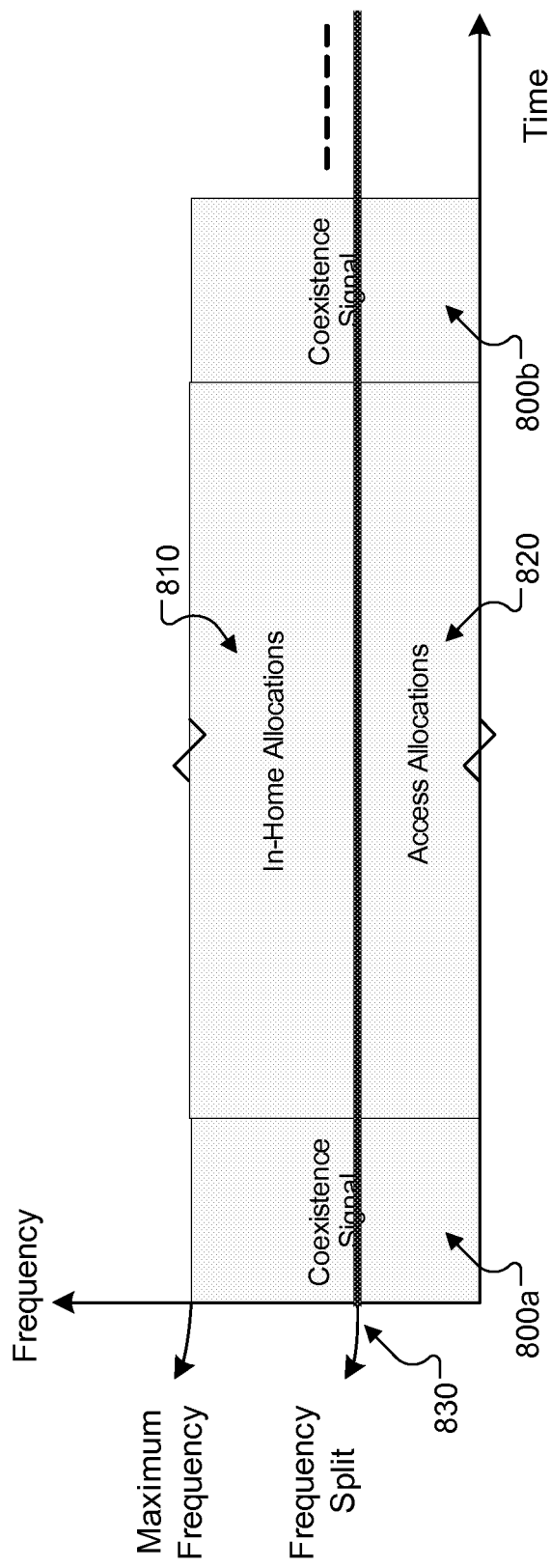
FIG. 8 is a timing diagram showing an example frequency division.

FIG. 8 is a timing diagram showing an example frequency division. In some implementations, the foreign coexistence networks and the access network can divide the bandwidth based upon a frequency division scheme. The coexistence signal 800a, 800b can continue to provide the networks with a mechanism by which to broadcast a request for bandwidth. However, the bandwidth requested is a range of frequencies. In some implementations, the coexistence signal 800a, 800b can be transmitted during a time period and can be transmitted on the frequencies requested. In other implementations, the coexistence signal 800a, 800b can be transmitted over all frequencies, thereby notifying other devices of the intent to use the specified bandwidth after a reservation period has expired.

The bandwidth can be allocated 50% to the access network and 50% to the foreign coexistence networks by default. However, the default arrangement can be modified based upon a request received from either the access network or the foreign coexistence networks. Bandwidth can then be reassigned using an in-home (e.g., foreign coexistence network) frequency allocation 810, and an access network allocation 820. The division between the in-home network frequency allocation 810 and the access network frequency allocation 820 can be defined by a frequency split 830

Figure 9:
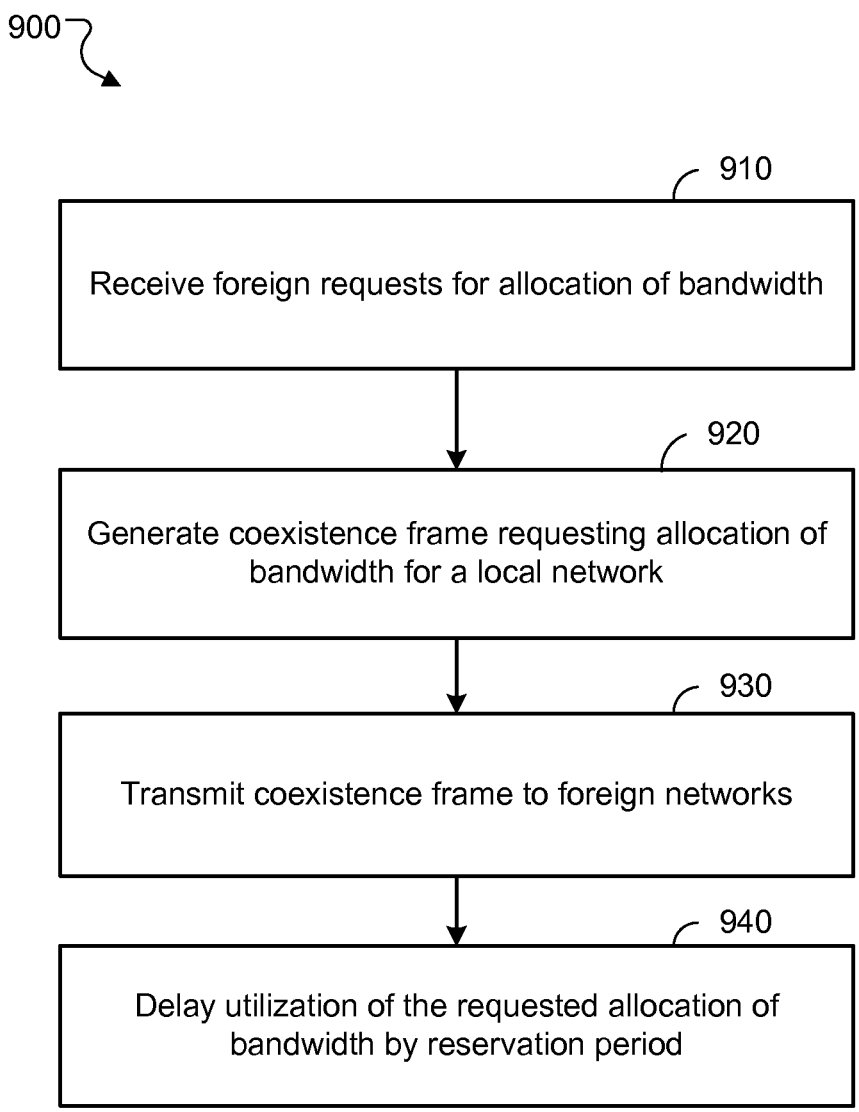
FIG. 9 is a flowchart illustrating an example process for providing foreign network coexistence.

FIG. 9 is a flowchart illustrating an example process 900 for providing foreign network coexistence. At stage 910, foreign requests for allocation of bandwidth can be received. The foreign requests for allocation of bandwidth can be received, for example, by an access network device (e.g., NTU 220 of FIG. 2) or an in-home coexistence device/network. In some implementations, the foreign requests for allocation of bandwidth can be received from coexistence networks (e.g., foreign devices using a different communication protocol). In some implementations, the foreign networks can include an access network and one or more in-home coexistence networks. In other implementations, the foreign networks can include only in-home coexistence networks. The foreign requests can be in the form of a coexistence signal (e.g., coexistence frame), and can be transmitted during periodically occurring coexistence slots. In some implementations, the foreign requests for allocation of bandwidth can provide a request for a specific piece of bandwidth (e.g., timeslot for TDMA networks or frequency range for FDMA networks) associated with a communications medium.

At stage 920, a coexistence frame requesting allocation of bandwidth for a local network can be generated. The coexistence frame can be generated, for example, by an access network device, or by an in-home coexistence network device. In some implementations, the coexistence frame can request a local allocation for the local network/device based upon the foreign allocation requests. For example, if other networks/devices have requested a set of allocations, the local allocation request can be sure to avoid requesting any allocations from the set of allocations requested by the other networks/devices. The local allocation thereby shares the communication media with the other networks/devices.

At stage 930, the coexistence frame can be transmitted to foreign networks. The coexistence frame can be transmitted, for example, by an access network device (e.g., NTU 220 of FIG. 2) or by an in-home coexistence network device. In some implementations, the coexistence frame can have a standard format that can be implemented by the foreign networks as well as the local network. The coexistence frame can be transmitted within a periodically occurring coexistence slot. In some implementations, a buffer can be applied on either or both sides of the coexistence frame to prevent the coexistence frame from crossing over outside of the periodically occurring coexistence slot.

At stage 940, utilization of the requested allocation of bandwidth can be delayed by one reservation period. The utilization of the request allocation of bandwidth can be delayed, for example, by an access network device or an in-home coexistence network device. In some implementations, a delay between the allocation request and utilization of the requested allocation can facilitate identification of problems with the requested allocation by foreign networks/devices. For example, if device A intends to transmit at time 0 and device B later signals an intent to transmit at time 0, device C can notify the later signaling device (e.g., device B) that the requested time has been previously allocated. In other examples, an access network/device might signal an allocation that uses some of the bandwidth belonging to the coexistence networks. If the coexistence networks are utilizing the requested bandwidth, the coexistence networks/devices can notify the access network/device that the requested allocation is being used by the coexistence networks/devices. In some implementations, the reservation period is set at nine coexistence slots between subsequent coexistence transmissions from the same device. However, other lengths associated with the reservation period can be used.

In some implementations, processes for synchronizing the sharing of a communications medium among a plurality of networks can be provided. For example, the plurality of networks can include a broadband over power line network. In one implementation, the networks can include IEEE access networks, IEEE in-home networks, foreign access networks, and foreign in-home networks. For example, the sharing process can be implemented with time division multiplexing (TDM) and/or frequency division multiplexing (FDM).

In one implementation, a method of sharing between a plurality of networks can include transmitting a coexistence frame from a plurality of networks by utilizing a periodically occurring coexistence slot; wherein the coexistence frame is utilized for negotiating and reserving a medium for transmission by a network. For example, the plurality of networks can include an access network and one or more in-home networks, and the plurality of networks can utilize different technologies. In one implementation, the coexistence frame can be based on a HomePlug 1.0 delimiter.

In one implementation, one of the networks reserves a periodically occurring coexistence slot. The network can determine the periodicity, i.e., the frequency, of the coexistence slot reservation based on a priority of network traffic. For example, some network traffic, such as video feeds, have a higher priority than other network traffic. Therefore, for higher priority traffic, the network can, for example, reserve every ninth coexistence slot. Furthermore, for lower priority traffic, the network can, for example, reserve every twentyseventh coexistence slot. The network can set the periodicity of the coexistence slot reservation at a lower value for lower priority traffic.

In one implementation, reserving a coexistence slot can include transmitting a slot allocation request from one of the networks to all of the other networks. The network can utilize the slot allocation that it requested, if it receives a slot allocation confirmation in to response to its request from all of the other networks. The slot allocation confirmations from the other networks can, for example, be transmitted during the other network's reserved coexistence slots.

In one implementation, reserving a periodically occurring coexistence slot can include selecting a network identifier at the network. The network can provide the network identifier to the other networks and determine whether the other networks approve the network identifier of the network.

In one implementation, one of the plurality of networks can determine a start of the coexistence slot with a fixed offset from an AC line cycle zero cross associated with the network (e.g., as described with reference to FIG. 5). The remaining plurality of networks can then, for example, determine a start of the coexistence slot based on where the coexistence frames are heard relative to a AC line cycle associated with the network. In one implementation, the remaining plurality of networks can track a coexistence slot based on the reception of a coexistence frame heard from another network, wherein the coexistence frame can include information on the number of hops between the current network and the network tracking the AC line cycle.

In one implementation, the reservation of the communications medium by the network can include one or more intervals between coexistence slots that are owned by the network. For example, the duration of the interval reserved by the network can be based on a policy, wherein the purpose of the policy is to facilitate the plurality of networks having an equal share of the medium. In other examples, the policy can facilitate the plurality of networks having a weighted share of the medium (e.g., based upon the priority of the traffic associated with the respective networks).

In one implementation, a first network can receive a request from a second network to swap an allocation interval period with the second network. For example, network A and network B can be utilizing different allocation interval periods, wherein network A is using allocation interval periods 1-10 and network B is using allocation interval periods 11-20. However, the allocation interval periods 16-20 may not be equivalent to the allocation interval periods 1-15. Therefore, in one implementation, network B can request network A to swap their respective allocation interval periods.

In response, in one implementation, network A may agree to the swap and take allocation interval periods 11-20 and network B would take allocation interval periods 0-10. In response, in another implementation, network A may not be able to take allocation interval periods 11-20 if allocation interval periods 16-20 are not equivalent. Therefore, network A can decrease its allocation interval periods to 1-8; therefore, allowing network B to take allocation interval periods 9-15. Thus, network B is allowed to increase its equivalent allocation interval periods by two.

The systems and methods disclosed herein may use data signals conveyed using networks (e.g., local area network, wide area network, internet, etc.), fiber optic medium, carrier waves, wireless networks (e.g., wireless local area networks, wireless metropolitan area networks, cellular networks, etc.), etc. for communication with one or more data processing devices (e.g., mobile devices). The data signals can carry any or all of the data disclosed herein that is provided to or from a device.

The methods and systems described herein may be implemented on many different types of processing devices by program code comprising program instructions that are executable by one or more processors. The software program instructions may include source code, object code, machine code, or any other stored data that is operable to cause a processing system to perform methods described herein.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that software instructions or a module can be implemented for example as a subroutine unit of code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

These and other implementations are within the scope of the following claims.

What is claimed is:

1. A method for allocating bandwidth between a plurality of networks, comprising:
    receiving requests for bandwidth allocation from each of the plurality of networks with whom a local network is sharing bandwidth;
    reserving one of multiple periodically occurring coexistence slots, for use by the local network, by transmitting a slot allocation request in an apparently available coexistence slot after observing the coexistence slots for a period of time to determine observed networks using respective coexistence slots, the slot allocation request including an apparently available network identifier, and receiving slot allocation confirmations from others of the plurality of networks with whom the local network is sharing bandwidth transmitted during respective periodically occurring coexistence slots reserved by the others of the plurality of networks in response to the slot allocation request from the local network, the slot allocation confirmations from respective networks confirming that the respective network is not assigned the apparently available coexistence slot and is not using the apparently available network identifier;

in response to receiving slot allocation confirmations from each of the observed networks, generating a coexistence frame requesting an allocation of bandwidth for the local network, the allocation being based upon the requests for bandwidth allocation received from the plurality of networks with whom the local network is sharing bandwidth;

transmitting the coexistence frame to the plurality of networks with whom the local network is sharing bandwidth during the periodically occurring coexistence slot reserved for use by the local network; and waiting a reservation period comprising a number of periodically occurring coexistence slots between transmitting the coexistence frame and transmitting during the allocation of bandwidth requested by the local network.

2. The method of claim 1, wherein the allocation of bandwidth comprises bandwidth allocated using time division multiplexing or frequency division multiplexing.

3. The method of claim 1, wherein the local network comprises an access network and the plurality of networks comprise one or more in-home networks.

4. The method of claim 1, wherein the plurality of networks are based on multiple technologies.

5. The method of claim 1, wherein one of the plurality of networks reserves a periodically occurring coexistence slot other than the periodically occurring coexistence slot used by the local network and periodically occurring slots used by others of the plurality of networks.

6. The method of claim 5, wherein the periodicity of the coexistence slot is based on a priority of network traffic associated with a respective network or local network.

7. The method of claim 6, wherein the periodicity of the coexistence slot decreases for a network with lower priority traffic.

8. The method of claim 1, further comprising reserving the allocation of bandwidth using the periodically occurring coexistence slot reserved for use by the local network by:

after transmitting the slot allocation request from one of the plurality of networks to the others of the plurality of networks and receiving the slot allocation confirmations, utilizing the periodically occurring coexistence slot reserved for use by the local network for periodically transmitting coexistence frames.

9. The method of claim 8, wherein reserving a periodically occurring coexistence slot further comprises:

claiming the apparently available network identifier based on whether the network identifier is observed to be available during the period of time in which the slots are observed; and determining whether another of the plurality of networks is using the claimed network identifier based on the slot allocation confirmations.

10. The method of claim 1, wherein the coexistence slots are synchronized to an AC line cycle.

11. The method of claim 1, wherein the period of the coexistence slot is a multiple of one half of an AC line cycle period.

12. The method of claim 1, wherein the local network determines a start of the coexistence slot with a fixed offset from an AC line cycle zero cross associated with the network.

13. The method of claim 12, wherein the plurality of networks determine a start of the coexistence slot based on where the coexistence frames are heard relative to a AC line cycle associated with the network.

14. The method of claim 13, wherein the plurality of networks track a coexistence slot based on the reception of a coexistence frame heard from the local network; wherein the coexistence frame comprises information on the number of hops between the current network and the network tracking the AC line cycle.

15. The method of claim 12, wherein the local network is an access network.

16. The method of claim 13, wherein the local network is an in-home network.

17. The method of claim 16, wherein the in-home network transmits a coexistence frame.

18. The method of claim 17, wherein the coexistence frame comprises an indication that the coexistence frame was generated by a proxy access network comprising the in-home network.

19. The method of claim 1, further comprising sending a slot re-synchronization frame in response to determining that there are non coordinating coexistence slots from the plurality of networks.

20. The method of claim 19, wherein responsive to the slot re-synchronization frame, the plurality of networks re-synchronize with the other coexistence slots.

21. The method of claim 1, wherein the reservation of the medium by the network comprises one or more intervals between coexistence slots that are owned by the network.

22. The method of claim 21, wherein a duration of the interval reserved by the network is based on a policy.

23. The method of claim 22, wherein the policy facilitates equal allocation of the medium between the plurality of networks and the local network.

24. The method of claim 3, wherein the allocation method negotiates a separate frequency band for the access network and the one or more in-home networks share the remaining frequency band.

25. The method of claim 1, wherein the coexistence frame is based on a HomePlug 1.0 delimiter.

26. A method of sharing bandwidth between a plurality of networks, comprising:

reserving a first of multiple periodically occurring coexistence slots, for use by one of the plurality of networks, by transmitting a slot allocation request in an apparently available coexistence slot after observing the coexistence slots for a period of time to determine observed networks using respective coexistence slots, the slot allocation request including an apparently available network identifier, and receiving slot allocation confirmations from others of the plurality of networks transmitted during respective periodically occurring coexistence slots reserved by the others of the plurality of networks in response to the slot allocation request from the network reserving the first periodically occurring coexistence slot, the slot allocation confirmations from respective networks confirming that the respective network is not assigned the apparently available coexistence slot and is not using the apparently available network identifier;

in response to receiving slot allocation confirmations from each of the observed networks, generating a respective coexistence frame and transmitting the respective coexistence frame from each of one or more of the plurality of networks during a respective reserved periodically occurring coexistence slot; wherein the coexistence frame is utilized for requesting an allocation of bandwidth on a medium; and transmitting by a respective network during the allocation of bandwidth requested by the respective network, after transmitting the respective coexistence frame, after waiting a reservation period comprising a number of periodically occurring coexistence slots.

27. The method of claim 26, where the sharing between the plurality of networks comprises:
time division multiplexing (TDM); and
frequency division multiplexing (FDM).

28. The method of claim 26, wherein the plurality of networks comprise:
an access network; and
and one or more in-home networks.

29. The method of claim 26, wherein the plurality of networks are based on different technologies.

30. The method of claim 26, wherein the plurality of networks are in-home networks.

31. The method of claim 26, wherein one of the plurality of networks reserves a periodically occurring coexistence slot.

32. The method of claim 31, wherein the periodicity of the coexistence slot is based on a priority of network traffic.

33. The method of claim 32, wherein the periodicity of the coexistence slot decreases for a network with lower priority traffic.

34. The method of claim 26, further comprising reserving the allocation of bandwidth using the reserved periodically occurring coexistence slot by:
after transmitting the slot allocation request from one of the plurality of networks to the other networks and receiving the slot allocation confirmations,
utilizing the reserved periodically occurring coexistence slot for periodically transmitting coexistence frames.

35. The method of claim 31, wherein reserving a periodically occurring coexistence slot comprises:
selecting the apparently available network identifier at the network based on whether the network identifier is observed to be available during the period of time in which the slots are observed.

36. The method of claim 34, wherein reserving a periodically occurring coexistence slot further comprises:
providing a network identifier of the network; and
determining whether the other networks approve the network identifier of the network based on the slot allocation confirmations.

37. The method of claim 26, wherein the coexistence slots are synchronized to an AC line cycle.

38. The method of claim 26, wherein the period of the coexistence slot is a multiple of one half of an AC line cycle period.

39. The method of claim 26, wherein one of the plurality of networks determines a start of the coexistence slot with a fixed offset from an AC line cycle zero cross associated with the network.

40. The method of claim 39, wherein the remaining plurality of networks determine a start of the coexistence slot based on where the coexistence frames are heard relative to a AC line cycle associated with the network.

41. The method of claim 40, wherein the remaining plurality of networks track a coexistence slot based on the reception of a coexistence frame heard from another network; wherein the coexistence frame comprises information on the number of hops between the current network and the network tracking the AC line cycle.

42. The method of claim 39, wherein the network is an access network.

43. The method of claim 39, wherein the network is an in-home network.

44. The method of claim 41, wherein the in-home network transmits a coexistence frame.

45. The method of claim 41, wherein the coexistence frame comprises an indication that the coexistence frame was generated by a proxy access network comprising the in-home network.

46. The method of claim 26, wherein in response to determining that there are non-coordinating coexistence slots from the plurality of networks, the network sends a slot re-synchronization frame.

47. The method of claims 46, wherein in response to hearing the slot synchronization frame, the plurality of networks re-synchronize with other coexistence slots.

48. The method of claim 26, wherein the reservation of the medium by the network comprises one or more intervals between coexistence slots that are owned by the network.

49. The method of claim 48, wherein a duration of the interval reserved by the network is based on a policy.

50. The method of claim 49, wherein the policy facilitates the plurality of networks having an equal share of the medium.

51. The method of claim 28, wherein the sharing method negotiates a separate frequency band for the access network and the one or more in-home networks share the remaining frequency band.

52. The method of claim 26, wherein the coexistence frame is based on a HomePlug 1.0 delimiter.

* * * * *